United States Patent
Saripalle et al.

(10) Patent No.: US 12,141,251 B2
(45) Date of Patent: Nov. 12, 2024

(54) AUTHENTICATION OF A USER BASED ON ANALYZING TOUCH INTERACTIONS WITH A DEVICE

(71) Applicant: Jumio Corporation, Palo Alto, CA (US)

(72) Inventors: Sashi Kanth Saripalle, Overland Park, KS (US); Spandana Vemulapalli, Kansas City, MO (US); Stephanie Firehammer, Kansas City, MO (US)

(73) Assignee: Jumio Corporation, Sunnyvale, CA (US)

( * ) Notice: Subject to any disclaimer, the term of this patent is extended or adjusted under 35 U.S.C. 154(b) by 747 days.

(21) Appl. No.: 16/281,935

(22) Filed: Feb. 21, 2019

(65) Prior Publication Data

US 2020/0275271 A1    Aug. 27, 2020

(51) Int. Cl.

| G06F 3/048 | (2013.01) |
|---|---|
| G06F 3/04883 | (2022.01) |
| G06F 21/31 | (2013.01) |
| G06F 21/32 | (2013.01) |
| G06V 10/80 | (2022.01) |
| G06V 40/20 | (2022.01) |
| G06V 40/50 | (2022.01) |
| H04W 12/065 | (2021.01) |

(52) U.S. Cl.
CPC .......... *G06F 21/31* (2013.01); *G06F 3/04883* (2013.01); *G06F 21/32* (2013.01); *G06V 10/809* (2022.01); *G06V 40/28* (2022.01); *G06V 40/50* (2022.01); *H04W 12/065* (2021.01)

(58) Field of Classification Search
CPC .. H04W 12/065; G06F 3/04883; G06F 21/32; G06F 21/31; G06K 9/00926; G06K 9/00355; G06K 9/6292; G06K 9/6267
See application file for complete search history.

(56) References Cited

U.S. PATENT DOCUMENTS

| 2013/0147972 | A1* | 6/2013 | Niinuma | G06V 10/993 348/207.1 |
|---|---|---|---|---|
| 2014/0344954 | A1* | 11/2014 | Kim | H04L 63/105 726/28 |
| 2015/0213244 | A1* | 7/2015 | Lymberopoulos | ......................... H04L 63/0861 726/18 |
| 2016/0239649 | A1* | 8/2016 | Zhao | H04W 12/065 |
| 2021/0026941 | A1* | 1/2021 | Li | G06F 21/30 |
| 2021/0076212 | A1* | 3/2021 | Manikantan Shila | ...................... H04L 63/0861 |

FOREIGN PATENT DOCUMENTS

| CN | 105980973 A | 9/2016 |
|---|---|---|
| CN | 107615288 A | 1/2018 |

* cited by examiner

*Primary Examiner* — Aleksey Olshannikov
(74) *Attorney, Agent, or Firm* — Patent Law Works, LLP

(57) ABSTRACT

Methods, systems, and apparatus, including computer programs encoded on a computer storage medium, for continuous identity authentication based on gesture data. In one aspect, a method includes receiving gesture data corresponding to one or more gestures received on a touch screen of the mobile device from an individual, generating specific features extracted from the one more gestures, comparing the specific features with gesture data collected on the mobile device from a user previously interacting with the mobile device, and verifying that an identity of the individual matches an identity of the previous user.

2 Claims, 8 Drawing Sheets

AUTHENTICATION OF A USER BASED ON ANALYZING TOUCH INTERACTIONS WITH A DEVICE

TECHNICAL FIELD

This specification generally relates to methods in authentication on mobile devices.

BACKGROUND

Systems incorporating authentication on mobile devices uniquely identify users of mobile devices. Identity authentication includes gesture recognition for users of mobile devices.

SUMMARY

Implementations of the present disclosure are generally directed to verifying user identity through user's interaction with device including capacitive communication. More specifically, implementations are directed to communicating data flows through touch credentials of trusted on-body devices as an initial (or secondary) factor, or as a token of identity. Increased data flow communications to establish user identity with an external object improves interaction speed and reduces interaction time between the user and the external object.

In a general implementation, systems, apparatus, and methods for continuous identity authentication of an individual based on gesture data include, receiving gesture data corresponding to one or more gestures received on a touch screen of the mobile device from an individual, generating specific features extracted from the one more gestures, and comparing the specific features with gesture information stored on the mobile device. The gesture information comprises gesture data collected on the mobile device from a user previously interacting with the mobile device. Verification is made based on the comparing that an identity of the individual matches an identity of the previous user.

In yet another general implementation, a system includes a mobile device, a one or more processors, and a computer-readable storage device coupled to the one or more processors and having instructions stored thereon which, when executed by the one or more processors, cause the one or more processors to perform operations that include receiving gesture data corresponding to one or more gestures received on a touch screen of the mobile device from an individual, generating specific features extracted from the one more gestures, and comparing the specific features with gesture information stored on the mobile device. The gesture information comprises gesture data collected on the mobile device from a user previously interacting with the mobile device. Verification is made based on the comparing that an identity of the individual matches an identity of the previous user.

In another general implementation, one or more non-transitory computer-readable storage media coupled to one or more processors and having instructions stored thereon which, when executed by the one or more processors, cause the one or more processors to perform operations that include receiving gesture data corresponding to one or more gestures received on a touch screen of the mobile device from an individual, generating specific features extracted from the one more gestures, and comparing the specific features with gesture information stored on the mobile device. The gesture information comprises gesture data collected on the mobile device from a user previously interacting with the mobile device. Verification is made based on the comparing that an identity of the individual matches an identity of the previous user.

An aspect combinable with the general implementations, the operations or method includes gesture data comprising touch data corresponding to location, force, and size of the one or more gestures, and includes motion data corresponding to accelerometer data, gyroscope data, magnetometer data, and proximity data of the mobile device during the receiving of gesture data.

In an aspect combinable with any of the previous aspects, the operations or method includes generating an enrollment template associated with the previous user based upon the gesture data collected on the mobile device.

In an aspect combinable with any of the previous aspects, the operations or method includes the enrollment template comprising one or more classifiers, each representing a classification of the one or more gestures.

In an aspect combinable with any of the previous aspects, the operations or method includes updating the enrollment template based upon the comparing, in which the one or more classifiers are changed.

In an aspect combinable with any of the previous aspects, the operations or method includes the one or more classifiers being associated with one or more orientation configurations of the mobile device when the gesture data is received by the mobile device from the individual.

In an aspect combinable with any of the previous aspects, the operations or method includes generating an update for the updated enrollment template to include a change to the one or more classifiers based upon the one or more orientation configurations.

Particular implementations of the subject matter described in this disclosure can be implemented so as to realize one or more of the following advantages. Implementing continuous identity authentication/verification provides for improved security for an individual when interacting with a mobile device. By monitoring and making use of gestures unique to an individual, identity of the individual may be continually authenticated/verified, and the uniqueness of the individual's gestures may be updated base the individual's gestures changing over time and space.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
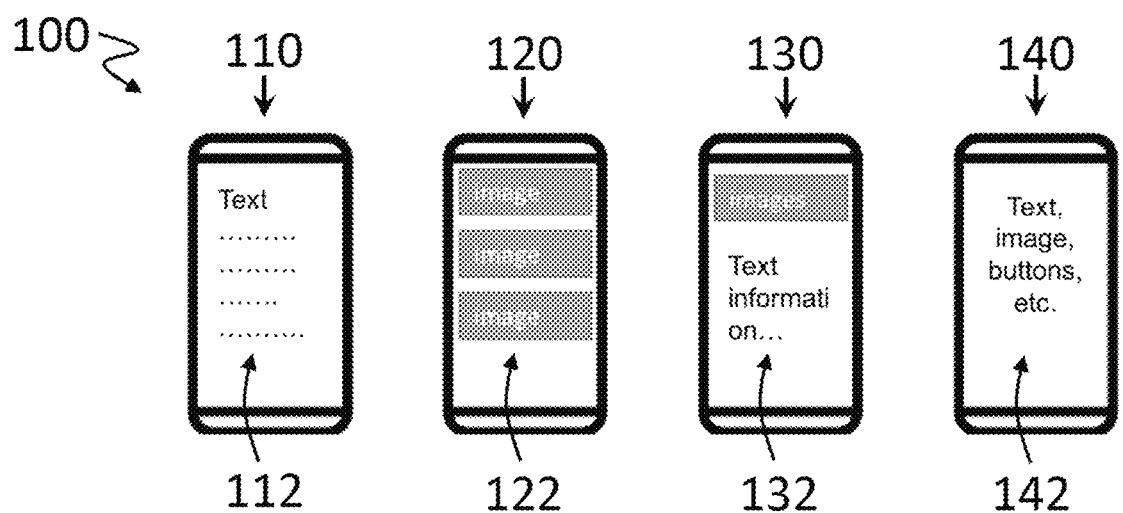
FIG. 1 depicts an example environment in which gesture input is provided on a mobile device.

Implementations of the present disclosure are generally directed to verifying identification of a user of a mobile device. More particularly, implementations of the present disclosure are directed to generating an enrollment template and compare verification data with aspects of the enrollment template to verify identity of the use providing the verification data.

Various identification/authentication systems are based on capturing, collecting, and storing gesture data input to a touch screen of a mobile device, and comparing and analyzing authentication gesture data with with aspects of reference gesture data to authenticate and verify an identity of a user of the mobile device.

Authentication systems may employ models, templates, maps, similarity scores, and so forth that are generated based on identity information data captured, collected, and stored from an individual and compared with identity information data having been previously known, collected or provided. All or a subset of the identity information data maybe fused to provide more comprehensive authentic identification from the aforesaid identity information data to be used by itself or to help with identity verification.

In view of the foregoing, and as described in further detail herein, implementations of the present disclosure provide for an identity authentication/verification system that can be deployed within a mobile device. In some implementations, the described identity authentication/verification system employs capturing, collecting, and storing gesture data to establish an enrollment template (unique user profile). By implementing establishment of an enrollment template for a user of a mobile device, gesture data for authentication/verification can be compared to authenticate and verify the identity of the user of the mobile device.

The identity authentication/verification system allows for passive, continuous authentication/verification on mobile devices. By continuously authenticating/verifying user identity, fraud and unauthorized access and utilization of particle services can be prevented. In some authentication/verification systems, verifying an individual's identity interrupts a user's experience and can take a relative long amount of time to authenticate/verify identity. In some situations, such as a financial transactions using a mobile device, once the user accesses financial accounts on the mobile device there is no assurance that the individual interacting with the financial accounts is the actual user who used their identity to allow for access to the financial accounts. In other situations, a mobile device can be stolen while the use has access to the financial accounts, such that whomever stole the mobile device now has access to the financial accounts. Accordingly, a more safe system and method must be implemented by which identity authentication/verification is continuous and does not interfere with the user's experience. Implementing a system and method that runs in the background of a mobile device and provides for continuous identity authentication/verification allows for improved security for person information stored on a mobile device.

FIG. 1 depicts an example environment 100 in which different gesture input is provided on mobile devices 110, 120, 130 and 140. In some implementations, the mobile devices 110, 120, 130, and 140 may be mobile phones, tablets, and laptop devices. In FIG. 1, authenticating an individual's identity may be based on the individual's touch-motion data input to a touch screen of a mobile device, which includes touch data comprising signals from touch screen sensors of a mobile device, in which the signals indicate finger location and pressure exerted on a touch screen while gestures are input to the mobile device, and motion data comprising signals from device sensors, such as an accelerometer, a magnetometer, and a gyroscope, while an individual is inputting a gesture pattern to the mobile device. Gestures comprise motions when a contact is made with the touch screen sensors of the mobile device, which include swipes, taps, etc., and gesture patterns comprise a collection or series of individual gestures.

In some implementations, different user interfaces (UI's) may require different touch-motion data input, including particular gestures and gesture patterns. For example, mobile device 110 may include a UI 112 that displays text. Accordingly, swipe-up/down gestures are provided to allow a user of the mobile device 110 to scroll through the text. In another instance, mobile device 120 may include a UI 122 that displays individual images. Accordingly, swipe-up/down gestures allow a user of the mobile device 110 to scroll through the images. Similarly, mobile device 130 may include a UI 132 that displays both text and individual images, in which swipe-up/down gestures are provided to allow a user of the mobile device 130 to scroll through the text and images. However, the swipe-up/down gestures for the UI 132 may be different for scrolling through the text versus scrolling through the images. In another example, mobile device 140 may include a UI 142 that displays text, images, and buttons for interacting with the text and images. Accordingly, swipe-up/down gestures allow a user of the mobile device 140 to scroll through the text and images, and tap gestures allow the user of the mobile device 140 to interact with additional information shown using the UI. In view of the different UI's provided with different software applications on mobile devices, as well as corresponding gesture patterns resulting from interaction with the different software application, authenticating an individual based on their touch-motion data can be problematic.

Figure 2:
FIG. 2 depicts an example environment in which gesture input is provided at orientations of a mobile device.

FIG. 2 depicts an example environment in which gesture input is provided at orientations of a mobile device. In FIG. 2, factors such as posture and environment play an important role in how a user interacts with a UI. Accordingly, such factors introduce a large intra-class variation in gestures and gesture patterns. In some implementations, gesture inputs in an example environment 200 is provided on mobile devices at different orientations. In some implementations, the mobile device may be a mobile phone, a tablet, and/or a laptop device, and gestures and gesture patterns may differ according to an orientation of the mobile device relative to a position of a user. For example, in orientation configuration 210, the user may be standing with the mobile device held in one hand at a position approximately level with the user's eyes. The orientation configuration 210 may include taking an image of the user (a "selfie"), conducting a video conference with another individual, or holding the mobile device to improve reception. In this circumstance, the gestures and gesture patterns may be unique to the orientation configuration 210.

In some implementations, a user of the mobile device may be in motion while holding the mobile device at eye level using both hands, such as orientation configuration 220. For example, the user can be walking and looking ahead to view and interact with the mobile device, while maintaining view of the area in which the user is walking. In this circumstance, the gestures and gesture patterns may be unique to the orientation configuration 220.

In some implementations, in orientation configuration 230, a user of the mobile device may be seated and driving a vehicle, in which the mobile device is held with one hand and the other hand is on a steering wheel controlling motion of the vehicle. For example, the user can be holding the mobile device at eye level while taking a selfie, conducting a video conference with another individual, or holding the mobile device to improve reception. While the mobile device is held at eye level, the user is also trying to keep an eye on driving the vehicle. In this circumstance, the gestures and gesture patterns may be unique to the orientation configuration 230.

In orientation configuration 240, which may be similar to orientation configuration 220, the user may be stationary, with an ability to hold the mobile device using both hand. In this orientation configuration 240, since the user has an improved control of the mobile device, the gestures and gesture patterns may be unique to the orientation configuration 240.

In orientation configuration 250, although the user may be stationary and holding the mobile device with both hands, a range of motion of the user's arms and hands is limited, as compared to orientation configuration 240. In this circumstance, the gestures and gesture patterns may be unique to the orientation configuration 240.

In view of the impact upon gestures and gesture patterns caused by posture and environment, templates can be created based on either external environment or device position or a combination of both. Accordingly, authenticating an individual's identity may be based upon the templates.

Pre-login and post-login scenarios may be implemented in determining templates with which to authenticate a user's identity.

In some implementations, the pre-login scenario comprises authenticating an individual in order to access certain information. While traditional biometric methods, such as facial recognition, for user authentication may be deficient due to computer vision limitations, use of gesture based authentication methods will help authenticate the user seamlessly. For example, facial recognition may be disadvantageous due to challenging illumination conditions and moderate pose variations. Introducing quality metrics in order to engage a user to move to a better location or change pose further encumbers the user's experience. Accordingly, usability of these biometrics are challenging, such that making use of passive, continuous authentication can limit the use of biometrics for purposes of user login.

In some implementations, the post-login scenario include login by an individual, but no continuous validation is necessary since it is supposed that the same individual is accessing the information until log-out. Traditional biometrics authenticate a person based on information gathered from a particular point in time. For example, if facial authentication is being used as a login method to access a bank account, then after login is completed no further validation is used since the same individual that logged-in is presumed to be accessing the bank account. However, this presumption induces significant risk for compromising sensitive personal information of the individual that originally logged-in.

In view of the problems associated with the pre-login and post-login scenarios, templates would need to be updated. Accordingly, authenticating an individual's identity may be based upon the updating templates.

Figure 3:
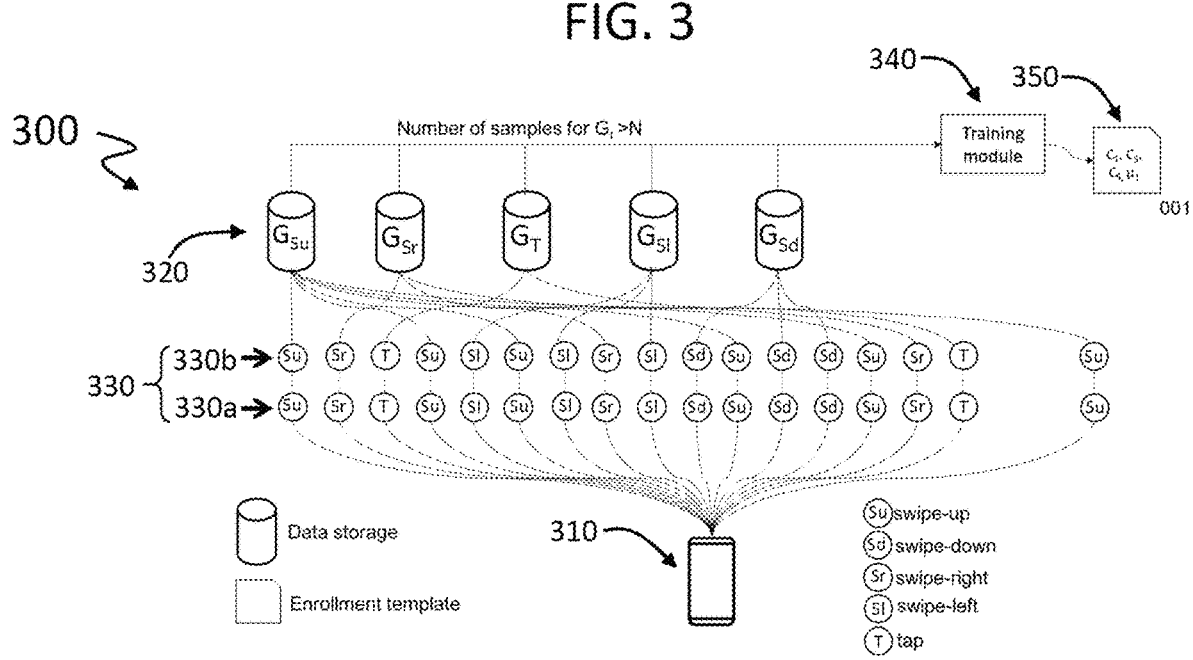
FIG. 3 depicts a system that can be used to implement the technology described herein.

FIG. 3 depicts a system that can be used to implement the technology described herein. In some implementation, an enrollment system 300 includes activating a continuous authentication method. For example, while an individual is interacting with a software application using a mobile device, touch-motion data associated with the individual's interaction is captured, collected, and stored in the background. Capturing and collecting gesture information associated with the touch-motion data provides for a rich set of training data, in the individual's gestures and gesture patterns are provided in a relatively unconstrained setting.

In FIG. 3, the enrollment system 300 includes processing of gesture data 320 received as input on mobile device 310, in which the mobile device 310 may be a mobile phone, a tablet, and/or a laptop device. In some implementations, various types of gestures 320a and 320b may be received on the mobile device 310. For example, the gestures 320a and 320b may be received on a touch screen of the mobile device 310, and include gestures, such as swipe-up Su, gesture swipe-down Sd, swipe-right Sr, swipe-left Sl, and tap T.

In some implementations, each of the gestures swipe-up Su, gesture swipe-down Sd, swipe-right Sr, swipe-left Sl, and tap T may include touch data $T_D$ and motion data $M_D$. For example, for the gesture swipe-up Su, touch data $T_{DSu}$ and motion data $M_{DSu}$ may be included with the gesture data 320. The touch data $T_{DSu}$ may include a time t around which the gesture data 320 was received on the mobile device 310, x-axis and y-axis coordinates of a pixel location on the touch screen of the mobile device 310 where the gestures 320a and 320b were received, a force or pressure p received on the touch screen of the mobile device 310 where gestures 320a and 320b were received, and an area/size s of the gesture when it was received on the touch screen of the mobile device 310.

The motion data $M_{DSu}$ may include the time t around which the gesture data 320 was received on the mobile device 310, accelerometer data a, gyroscope data g, magnetometer data m, and proximity data p, which may be provided by the mobile device 310 when the gesture is received on the touch screen of the mobile device 310. The accelerometer data a comprises x-axis accelerometer data $a_x$, y-axis accelerometer data $a_y$, and z-axis accelerometer data $a_z$. The gyroscope data g comprises x-axis gyroscope data $g_x$, y-axis gyroscope data $g_y$, and z-axis gyroscope data $g_z$. The magnetometer data m comprises x-axis magnetometer data $m_x$, y-axis magnetometer data $m_y$, and z-axis magnetometer data $m_z$.

In some implementations, the motion data $M_D$ may include addition calculated data based upon the accelerometer data a, the gyroscope data g, the magnetometer data m. For example, gravity data $g_r$ and orientation data r may be calculated based upon: the x-axis accelerometer data $a_x$; y-axis accelerometer data $a_y$; z-axis accelerometer data $a_z$; x-axis gyroscope data $g_x$; y-axis gyroscope data $g_y$; z-axis gyroscope data $g_z$; x-axis magnetometer data $m_x$; y-axis magnetometer data $m_y$; and z-axis magnetometer data $m_z$. The calculated data may be separately and appended to the motion data $M_D$.

The enrollment system 300 may capture, collect, and store the gesture data 320 in one or more data storage devices 330. In some implementations, the enrollment system 300 may capture, collect and store the gesture data 320 in accordance with a gesture category. For example, the enrollment system 300 may capture, collect, and store the gesture data 320 based a gesture type G. In some implementations, different types of gestures G from the gesture data 320 may be captured, collected, and stored in the data storage devices 330. For example, data storage device $G_{Su}$ may collect and store gesture data for swipe-up gestures Su, data storage device $G_{Sr}$ may collect and store gesture data for swipe-right gestures Sr, data storage device $G_T$ may collect and store gesture data for tap gestures T, data storage device $G_{Sl}$ may collect and store gesture data for swipe-left gestures S, and data storage device $G_{Sd}$ may collect and store gesture data for swipe-down gestures Sd.

The enrollment system 300 may include a training module 340. In some implementations, the training module 340 provides for receiving processed features from raw touch and motion data, applying machine learning models to predict a certain pattern of gestures which result in high verification confidence.

The enrollment system 300 may include an enrollment template 350. In some implementations, the enrollment template is a product for processing the gesture data 320 obtained from the mobile device 310. For example, the enrollment system 300 processes the gesture data 320 in order to produce the enrollment template 350 as a snap-shot of a user's unique gesturing peculiarities. By generating the enrollment template 350, a current user's gesturing patterns may be compared to the enrollment template 350 in order to authenticate and verify the user's identity.

The enrollment template 350 includes classifiers $C_G$, each classifier corresponds to each of the gesture types G. In FIG. 3, classifiers $C_1$, $C_3$, and $C_5$ are stored, indicating that gestures $G_1$, $G_3$, and $G_5$ are one user's unique gesturing peculiarities. For example, $C_1$ correspond to classification of gesture type $G_1$, which is associated with the swipe-up gesture Su. $C_3$ correspond to classification of gesture type $G_3$, which is associated with the swipe-right gesture Sr. $C_5$ correspond to classification of gesture type $G_5$, which is associated with the tap gesture T. Accordingly, the particular user's possesses unique gesturing peculiarities associated with the swipe-up gesture Su, the swipe-right gesture Sr, and the tap gesture T. Based upon the particular user's unique gesturing peculiarities, verification gesture data provided by the particular user during interaction with the mobile device 310 should verify a reasonably match with the enrollment template 350 associated with the particular user. Conversely, verification gesture data provided by a different user during interaction with the mobile device 310, either during the original (particular) user interacting with the mobile device 310 or after the original (particular) user is no longer interacting with the mobile device 310, should convey no reasonably match with the enrollment template 350. Accordingly, an identity of an individual using the mobile device 310 can be continually verified while the individual is interacting with the mobile device 310. In the event that the identity of an individual cannot be verified at times while the mobile device 310 is being used, functional operation of the mobile device 310 can be altered.

Figure 4:
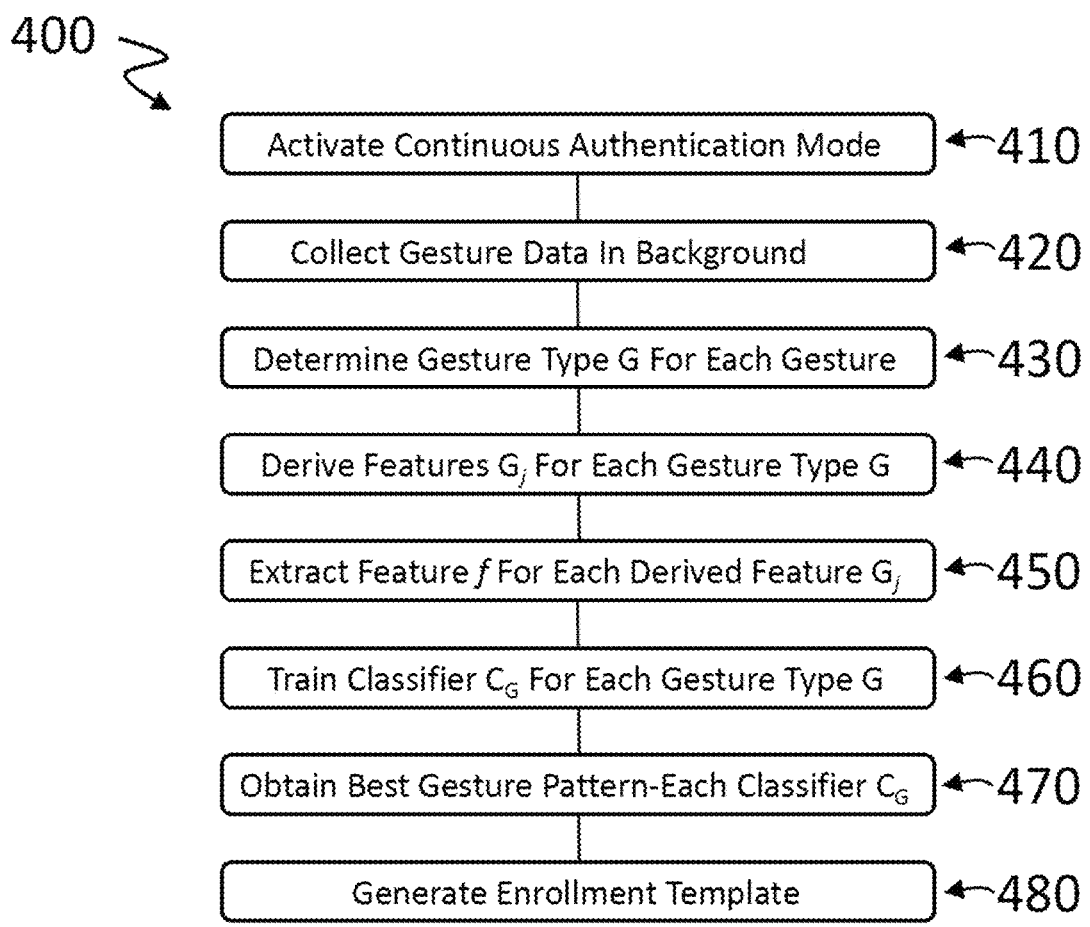
FIG. 4 depicts an exemplary method to implement the system of FIG. 3.

FIG. 4 depicts an exemplary method to implement the system of FIG. 3. In FIG. 4, an enrollment method 400 includes steps to establish an enrollment template, such as the enrollment template 350 depicted in FIG. 3. An identity of an individual using a mobile device can be continually verified while the individual is interacting with the mobile device.

Step 410 includes activating a mode for continuous authentication of a user's identity. In some implementations, activating a continuous authentication mode may be manual activated by an individual using of a mobile device or can be set-up by an individual to activate upon recognition that particular interaction is occurring with the mobile device. For example, activating a continuous authentication mode may be manual activated by an individual when the individual is first interacting with the mobile device, either a new mobile device or a mobile device not previously having an option to manual activate a continuous authentication mode. Additionally, activating a continuous authentication mode may be manual activated by an individual when new software applications are purposely added to the mobile device. In instances where software application(s) require or recommend activation of a continuous authentication mode, the individual may selected to activate the continuous authentication mode upon recognition by the software application(s) that interaction is desired by the individual. For enrollment method 400, step 410 includes activation of a continuous authentication mode.

Step 420 includes collecting gesture data in the background while a user provides gestures when interacting with a mobile device. In some implementations, enrollment method 400 may initiate a software application on the mobile device to produce a UI in order to receive specific types of gestures. For example, the enrollment method 400 may initiate activation of a game on the mobile device, in which a UI is produced that requires specification swipe and tap gestures in order to capture, collect, and store a user's unique biophysical interactions with a touch screen of the mobile device. In this manner, the user's gesture data can be captured, and collect and stored in the background while the user continues interacting with the game.

In some implementations, enrollment method 400 may initiate a software application on the mobile device to produce a UI in order to request input of specific types of gestures. For example, the enrollment method 400 may cause the mobile device to produce a UI showing different gestures to be input by a user of the mobile device, and a sequence of requests for inputting the gestures onto the touch screen of the mobile device. The enrollment method 400 may provide feedback to the user of the mobile device when the requested gesture input is sufficient and has been accepted, or when the requested gesture input is not sufficient and the particular request for the requested gesture input is again made.

At step 420, enrollment system 300 depicted in FIG. 3 may be implemented in order to capture, collect, and store an individual's gesture data 320. For example: (1) gesture data associated with swipe-up Su gestures is captured, collected, and stored at data storage unit $G_{Su}$; (2) gesture data associated with swipe-down Sd gestures is captured, collected, and stored at data storage unit $G_{Sd}$; (3) gesture data associated with swipe-right Sr gestures is captured, collected, and stored at data storage unit $G_{Sr}$; (4) gesture data associated with swipe-left Sl gestures is captured, collected, and stored at data storage unit $G_{Sl}$; and (5) gesture data associated with tap T gestures is captured, collected, and stored at data storage unit $G_T$.

Step 430 includes determining a gesture type G for each gesture provided with the gesture data captured in step 420. In some implementations, gesture types can be determined from touch data $T_D$ and motion data $M_D$ that is provided with the gesture data. For example, receiving location of gestures, force or pressure of the gestures, area/size of the gestures, motion associated with receiving the gestures including accelerometer data, gyroscope data, magnetometer data, gravity data, and orientation data can be used to determine the gesture type G.

Step 440 includes deriving features $G_j$ for each of the gesture types G determined in Step 430. In some implementations, after an N-number of samples of gesture data has been collected, features $G_j$ can be derived. For example, features for each gesture type G determined in Step 430 may be expressed by:

$G_{j,A} = \{\vec{T}_j, \vec{M}_j\}$, where j represents the gesture type,
G represents gestures of swipe-up, swipe-down, swipe-left, swipe-right, and tap, $\vec{T} = (t_i, x_i, y_i, p_i, s_i)$, and $\vec{M} = (a_{xi}, a_{yi}, a_{zi}, g_{xi}, g_{yi}, g_{zi}, m_{xi}, m_{yi}, m_{zi}, P_i) \forall i = 1:N$ In touch feature $\vec{T}$, coordinates "x" and "y" represent pixel location on a touch screen where the sample gesture is captured, "p" represents pressure or force applied to the touch screen while the sample gesture is captured, "s" represents size/area of contact on the touch screen while the sample gesture is captured, and "t" represents the time at which the sample gesture was captured. In motion feature $\vec{M}$, "a" represents accelerometer data, "g" represents gyroscope data, "m" represents magnetometer data, and "P" represents proximity data. Touch feature $\vec{T}$ and motion feature $\vec{M}$ are calculated for each of the N-number of samples.

In some implementations, soft signal data also may be calculated. For example, gravity "$g_r$," and device orientation "r" may be calculated and appended to the motion feature $\vec{T}$.

Step 450 includes creating representations of each of the features $G_j$ derived in Step 440 by extracting features $f$. In some implementations, extracting features $f$ for each derived feature $G_j$ includes an extraction function $f(G_{j,A}) = f_j$. For example, extraction function $f$ of swipe-down gesture $G_{Sd}$ yields features $f_{Sd}$. For each derived feature $G_{Su}$, $G_{Sd}$, $G_{Sr}$, $G_{Sl}$, and $G_T$, a corresponding feature $f_{Su}$, $f_{Sd}$, $f_{Sr}$, $f_{Sl}$, and $f_T$ is extracted.

Step 460 includes training a classifier $C_G$ for each gesture type G. After capturing, collecting, and storing an N-number of samples of each gesture type G, a classifier $C_G$ is trained for each gesture type G using the N-number of samples. For example, for the gesture types swipe-up Su, swipe-down Sd, swipe-right Sr, swipe left Sl, and tap T, determined in Step 430, classifiers $C_1$, $C_2$, $C_3$, $C_4$, and $C_5$ are trained. Here, $C_1$ corresponds to swipe-up Su gesture, $C_2$ corresponds to swipe-down Sd gesture, $C_3$ corresponds to swipe-right Sr gesture, $C_4$ corresponds to swipe left Sl gesture, and $C_5$ corresponds to tap T gesture.

Step 470 includes obtaining a best gesture pattern for each classifier trained in Step 460. In some implementations, based upon the performance of the individual classifiers $C_G$, a best gesture pattern can be obtained. For example, as FIG. 3 depicts, classifiers $C_1$, $C_3$, and $C_5$ indicate that the user providing the gesture data in Step 420 has the best performance using the swipe-up Su gesture, the swipe-right Sr gesture, and the tap T gesture.

In some implementations, a method can be used to determine whether the classifiers trained in Step 460 represent the best performance for the user providing the gesture data in Step 420. For example, a max voting method can be used in which at least two of three gestures should agree for determining that the three gestures establish a best performance of the classifiers $C_G$.

Step 480 includes generating an enrollment template associated with the user who provided the gesture data. In some implementations, an enrollment template includes the trained classifiers $C_G$ that provided for the best gesture pattern. For example, for the classifiers $C_1$, $C_3$, and $C_5$ depicted in FIG. 3, an enrollment template would comprise:

$Enr = \{C_1, C_3, C_5, (1, 3, 5)\}$, where 1, 3, and 5 represent swipe-up gesture Su, swipe-right gesture, and tap gesture At Step 480, the enrollment template is stored for use in authenticating an identity of a user of the mobile device.

Figure 5:
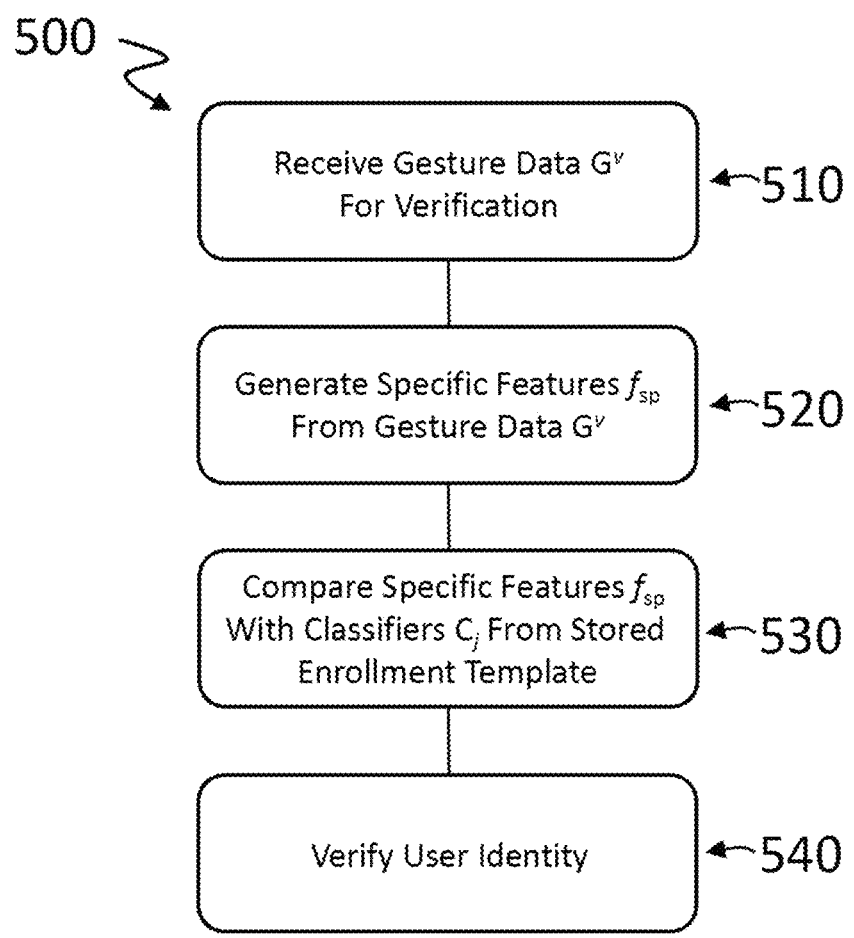
FIG. 5 depicts a system that can be used to implement the technology described herein.

FIG. 5 depicts a system that can be used to implement the technology described herein. In FIG. 5, identity verification of an individual may include comparing specific features with classifiers associated with a stored enrollment template, such as the enrollment template depicted in FIGS. 3 and 4. For example, Step 510 includes receiving verification samples $G_{j,A}^v$ (gesture data $G^v$ for verification). In particular, gesture data $G^v$ for verification is received from an individual interacting with a software application using a mobile device.

Step 520 includes generating specific feature $f_{sp}^v$ for verification from the gesture data $G^v$ for verification received during Step 510. For example, the specific feature $f_{sp}^v$ for verification may be generated from the gesture data $G^v$ for verification using steps depicted in the enrollment system depicted in FIG. 3 and the enrollment system depicted in FIG. 4.

The verification samples $G_{j,A}^v$ (gesture data $G^v$ for verification) are used to calculate the specific features $f_{sp}^v$ for verification. However, for the enrollment system and enrollment method depicted in FIGS. 3 and 4, the singular interest is with respect to $f_1^v$, $f_2^v$, $f_5^v$, which are based on the gesture pattern stored in the corresponding enrollment template having orientation configuration $\mu_1$. Here, $f_1^v$ corresponds to features associated with the swipe-up Su gesture for verification, $f_3^v$ corresponds to features associated with the swipe-right Sr gesture for verification, and $f_5^v$ corresponds to features associated with the tap T gesture.

Step 530 includes comparing the specific features $f_{sp}^v$ generated at Step 520 with classifiers $C_j$ from the stored enrollment template having orientation configuration $\mu_1$. In some instances, a distance is determined of a particular specific feature $f_j^v$ from a particular classifier $C_j$. For example, for the enrollment system and enrollment method depicted in FIGS. 3 and 4, a distance is determined of the swipe-up Su gesture data used for verification from the classifier $C_1$ stored for the user's enrollment template having orientation configuration $\mu_1$. If this distance is less than a threshold value "t," then the swipe-up Su gesture data used for verification is considered to be True. For the particular specific feature $f_3^v$, a distance is determined of the swipe-right Sr gesture data used for verification from the classifier $C_3$ stored for the user's enrollment template having orientation configuration $\mu_1$. If this distance is less than a threshold value "t," then the swipe-right Sr gesture data used for verification is considered to be True. For the particular specific feature $f_5^v$, a distance is determined of the tap T gesture data used for verification from the classifier $C_5$ stored for the user's enrollment template having orientation configuration $\mu_1$. If this distance is less than a threshold value "t," then the tap T gesture data used for verification is considered to be True.

Step 540 includes verifying the user's identity based upon acceptance of the verification gesture pattern if at least two of the three particular specific features used for verification $f_1^v$, $f_2^v$, $f_5^v$ are determined to be True via the max-voting rule. For the enrollment system and enrollment method depicted in FIGS. 3 and 4, the user's identity is verified since at least two of the three particular specific features used for verification $f_1^v$, $f_2^v$, $f_5^v$ are determined to be True based upon the comparison in Step 530.

In some implementations, variance in the gesture sample $G_j$ can be relatively large. For example, an individual can perform a simple gesture, such as a swipe-up gesture, differently based on multiple factors. As discussed above, posture and environment factors can adversely affect an individual's interaction with the UI on the mobile device. To create a robust passive authentication system based on touch-motion data, a continuous update to classifiers $C_j$ should be considered based on the information gleaned from posture, environment, and trust factors.

Figure 6:
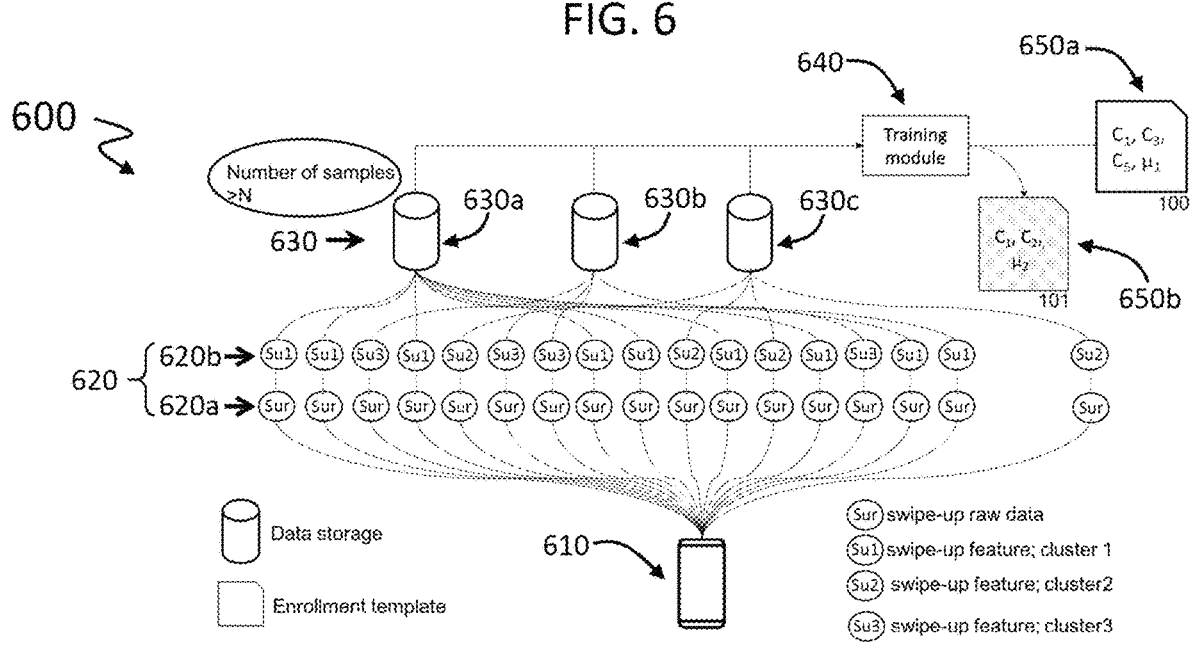
FIG. 6 depicts another system that can be used to implement the technology described herein.

FIG. 6 depicts another system that can be used to implement the technology described herein. In some implementations, updates to the enrollment template can be made based on an orientation configuration of the mobile device. For example, if the orientation configuration includes an individual situated in a sitting position versus a sleeping position, the manner in which the individual holds the mobile device can change. As a result, the orientation configuration can be quantified by obtaining output from one or more sensors on mobile device.

In some implementations, clustering may be used to generate most common orientation configurations in which an individual would use the mobile device. For example, by determining the most common orientation configurations ("clusters") in which an individual uses the mobile device, train templates corresponding to the clusters can be generated. In some implementations, an M-number of different enrollment templates for an individual may be generated based upon their device usage pattern. For example, as shown in FIG. 6, a swipe-up gesture is used for generating enrollment templates 100 and 101, which have classifiers trained from different gestures. In particular, enrollment template 100 includes classifiers $C_1$, $C_3$, $C_5$ and enrollment template 101 includes classifiers $C_1$ and $C_2$. Enrollment templates may also be generated for each of the swipe-up Su gesture, swipe-down Sd gesture, swipe-right Sr gesture, swipe-left Sl gesture, and tap T gesture. Different gesture patterns having different clusters may be enrolled.

In FIG. 6, a template update system 600 includes elements similar to those depicted in FIG. 3. For example, the template update system 600 includes data storage devices 620, which collect and store gesture data 620 (including individual gestures 630a and 630b) obtained from the mobile device 610, a training module 640, and enrollment templates 650a and 650b. However, in the template update system 600, enrollment template 650b is considered an updated enrollment template. Enrollment template 650b is generated based upon an orientation configuration of the mobile device 410 at the time that the gestures 630a and 630b were input to the mobile device 610.

In some implementations, a user of the mobile device 610 may exhibit different gestures when interacting with the mobile 610 in different positions, in which the mobile device 610 is positioned in different orientation configurations. For example, gestures provide by a user while the user is in a sitting position will yield gestures different from those while the user is in a reclined position. Accordingly, the template update system 600 may provide for an updated template 650b based upon a particular orientation configuration of the mobile device 610. As described with respect to FIGS. 3 and 4, aspects of gesture data corresponding to features of each gesture type G can include motion data $M_D$ associated with accelerometer data, gyroscope data, magnetometer data, and proximity data, as well as gravity data and device orientation data.

By determining and generating data clusters for common user positions while the user interacts with the mobile device, templates can be trained for each type of common user position. In some implementations, templates for each common user position can be trained. For example, for sitting, walking, standing, prone, and inclined positions in which a user would interact with the mobile device, templates could be trained. As depicted in FIG. 6, the swipe-up gesture is considered with respect to clustering of data.

In FIG. 6, swipe-up data 620 is captured from the mobile device 610 by user interaction with the mobile device 610. The swipe-up data 620 may include swipe-up raw data 620a that indicates general swipe-up gestures. Additionally, the swipe-up raw data 620a can include swipe-up cluster data 620b that includes aspects of the motion data $M_D$ that is collected by the user interaction with the mobile device 610. The swipe-up cluster data 620b includes data indicating a swipe-up gesture but also includes data indicating an orientation configuration of the mobile device 610 when the swipe-up gestures was input to the mobile device 610. As depicted in FIG. 6, data associated with three swipe-up gestures are captured according a particular orientation configuration of the mobile device 610. The three particular orientation configurations are denoted as cluster 1, cluster 2, and cluster 3. For example, cluster 1 may represent a vertical orientation configuration of the mobile device 610 when the swipe-up gesture is input to the mobile device 610. Cluster 2 may represent a horizontal orientation configuration of the mobile device 610 when the swipe-up gesture is input to the mobile device 610. Cluster 3 may represent a vertically inverted orientation configuration of the mobile device 610 when the swipe-up gesture is input to the mobile device 610.

For each of the three particular orientation configurations, which correspond to cluster 1, cluster 2, and cluster 3, a data storage device 620 is provided. For example, data storage device 620a is provided to collect and store data associated with the swipe-up Su gesture corresponding to cluster 1, data storage device 620b is provided to collect and store data associated with the swipe-up Su gesture corresponding to cluster 2, and data storage device 620c is provided to collect and store data associated with the swipe-up Su gesture corresponding to cluster 3.

In the template update system 600, training module 640 provides for receiving the processed features from touch and motion data of gestures, applying machine learning models which predict a certain pattern of gesture feature that result in high verification rate. This process is done for each cluster derived from device orientation.

From the training module 640, an updated enrollment template 650b can be generated and stored along with enrollment template 650a. Here, enrollment template 650a can include representations depicted in FIGS. 3 and 4, and described above. However, updated enrollment template 650b includes classifiers $C_G$ associated with user gestures input to the mobile device 610 based upon orientation configuration of the mobile device 610. Although FIG. 6 depicts the updated enrollment template 650b for the swipe-up Su gesture having classifiers $C_1$ and $C_2$ based upon cluster 1, cluster 2, and cluster 3, which correspond to three different orientation configurations of the mobile device 610, the updated enrollment template 650b includes classifiers $C_G$ associated with each of a plurality of gestures input to the mobile device 610 based upon different possible orientation configurations of the mobile device 610. For example, as described above with respect to FIGS. 3 and 4, the updated enrollment template 650b may include classifiers $C_G$ associated with each of the swipe-up Su gesture, swipe-down Sd gesture, swipe-right Sr gesture, swipe-left Sl gesture, and tap T gesture, and each classifier $C_G$ can be associated with a particular orientation configuration. In some implementations, multiple updated enrollment templates 650b may generated, each for a particular orientation configuration. For example, by determining, similar to the method depicted in FIG. 4, a best gesture pattern based upon performance of an individual classifier $C_G$ for a particular orientation configuration, an updated enrollment template may be generated for particular gestures in a particular orientation configuration.

The template update system 600 may provide for generating enrollment templates to further improve authentication/verification of a user's identity by taking into consideration different orientation configurations of the mobile device 610 when gesture inputs are received by the mobile device 610 from the user. For example, by using the system depicted in FIG. 5, a user's identity can be authenticated/verified based upon data representing additional aspects of gesture input with respect to orientation configuration of the mobile device 610.

Figure 7:
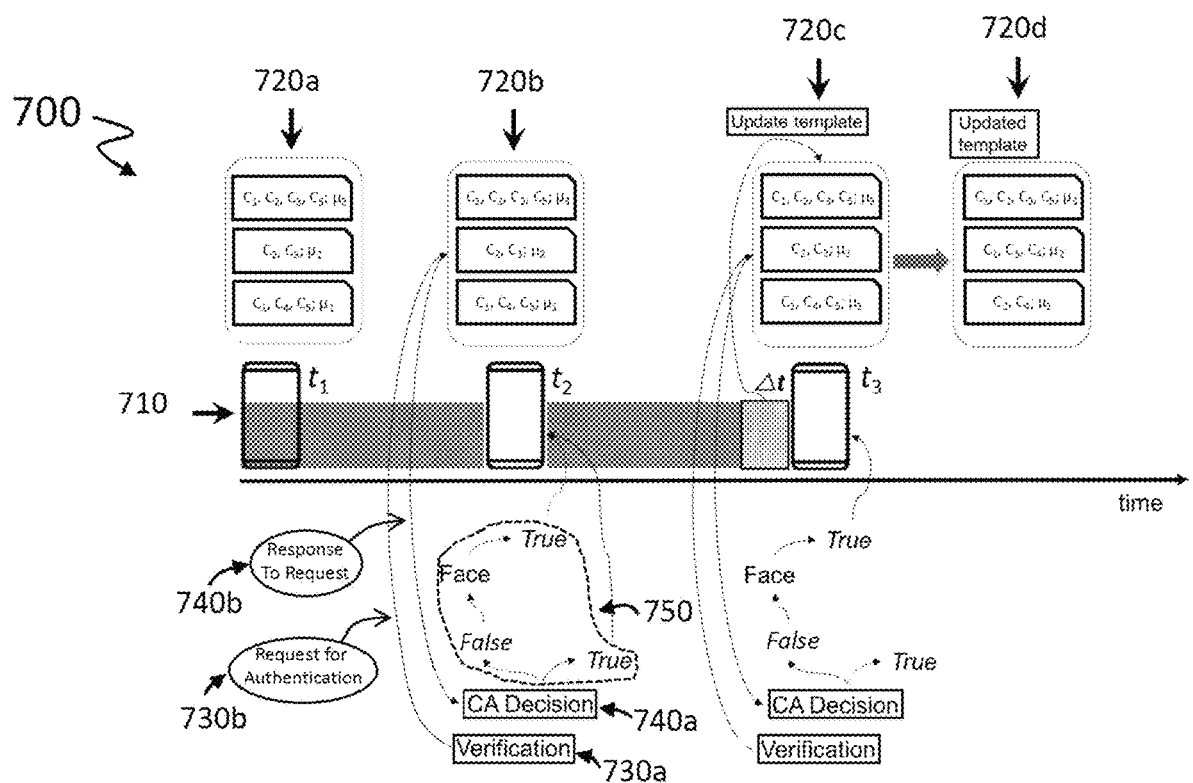
FIG. 7 depicts a continuous authentication system implementing the technology described herein.

FIG. 7 depicts a continuous authentication system implementing the technology described herein. In FIG. 7, a continuous authentication system is depicted showing authentication/verification of a user's identity using a mobile device 710 based upon using enrollment templates 720. Initially, at a time $t_1$, an enrollment template 720a is generated using the system and methods depicted in FIGS. 3 and 4. The enrollment template 720a includes classifiers $C_1$, $C_2$, $C_3$, and $C_5$ for an orientation configuration $\mu_3$, classifiers $C_2$ and $C_3$ for an orientation configuration $\mu_2$, and classifiers $C_1$, $C_4$, and $C_5$ for an orientation configuration $\mu_1$.

At a time later $t_2$, identity authentication/verification is conducted based upon enrollment template 720b. For example, during identity authentication/verification, identity verification 730a is initiated by a request for authentication 730b made to a mobile device 710 having stored thereon the enrollment template 720b. The mobile device 710 processes the request for authentication 730, as described with respect to FIGS. 3 and 4, and returns a response to request 740b from the mobile device 710.

Based upon the response to request 740b, a decision 740a is made by the mobile device 710 based upon the system and method depicted in FIG. 5. For example, verification samples $G_{jA}^v$ (gesture data $G^v$ for verification) may be received from an individual's interaction with the mobile device 710. Then, based upon comparing features of the verification samples $G_{jA}^v$ with classifiers $C_G$ from stored enrollment template 720b, a comparison 750 is made in order to determine a True or False condition with respect to authenticating/verifying the individuals identity. In FIG. 7, the decision 740a may be True based upon the comparison. In some implementations, the decision 740a could be False, whereby additional authentication/verification would be necessary. For example, based on the decision 740a being False, a biometric recognition may be used to authenticate/verify the individual's identity. In FIG. 7, a facial recognition is performed and results of True are rendered with respect to facial identity authentication/verification. In this instance, the authentication/verification of the individual's identity would be confirmed on the mobile device 710 at time $t_2$.

At a later time $t_3$, the mobile device 710 again processes the request for authentication 730b, and returns a response to request 740b from the mobile device 710 based upon verification samples $G_{jA}^v$ (gesture data $G^v$ for verification) received from the individual's interaction with the mobile device 710. However, at a time $\Delta t$ prior to time $t_3$, the update enrollment template 720c is updated based upon classifiers $C_2$ and $C_3$ with respect to orientation configuration $\mu_2$ and classifiers $C_1$, $C_4$, and $C_5$ with respect to orientation configuration $\mu_1$. Accordingly, updated enrollment template 720d is generated based upon classifiers $C_1$, $C_5$, and $C_4$ with respect to orientation configuration $\mu_2$ and classifiers $C_2$ and $C_4$ with respect to orientation configuration $\mu_1$.

Although FIG. 7 depicts generating a single updated template 720d, updated templates may be continuous generated as the individual interacts with the mobile device 710. In some implementations, as the individual transitions between various positions, the orientation configuration of the mobile device 710 may corresponding change. For example, if the individual transitions from a sitting position to an inclined position, the updated template 720d may be further updated based upon a change of gestures presented in the sitting position compared to gestures presented in the inclined position. Before, during, and after the transition from the sitting position to the inclined position, the individual's identity may be authenticated/verified based upon the system and methods depicted in FIGS. 3-6.

Figure 8:
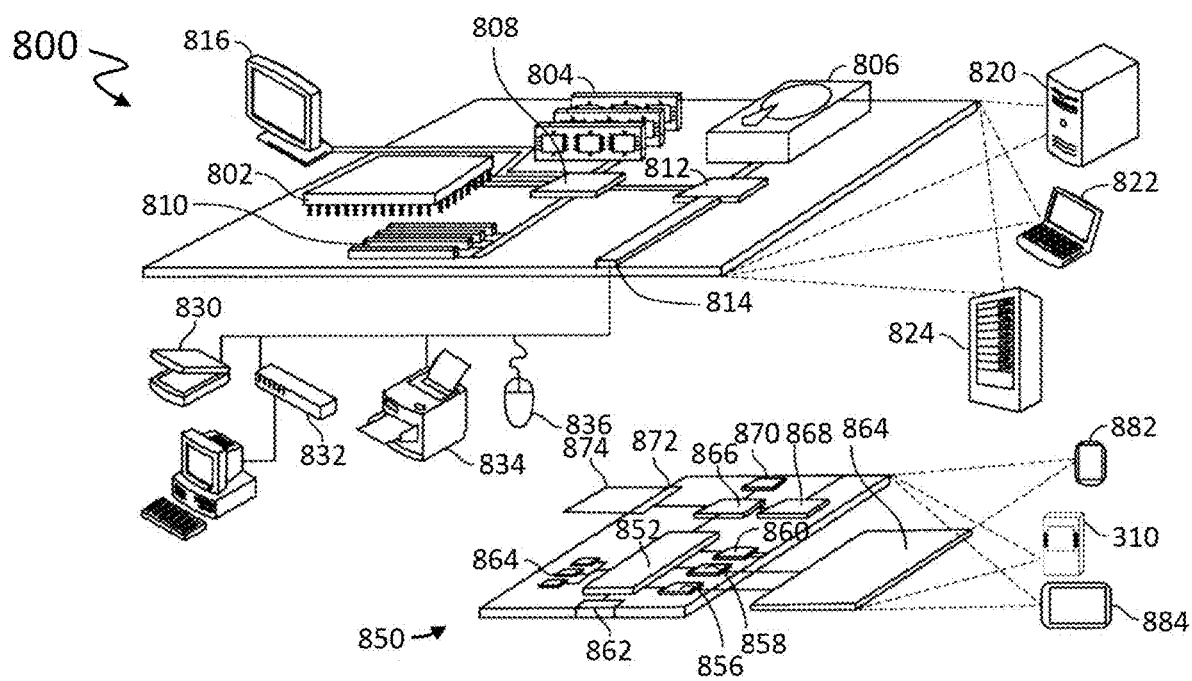
FIG. 8 is a block diagram representing examples of computing devices.

FIG. 8 is a block diagram representing examples of computing devices. FIG. 8 shows an example of a computing device 800 and a mobile computing device 850 that are employed to execute implementations of the present disclosure. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 800 includes a processor 802, a memory 804, a storage device 806, a high-speed interface 808, and a low-speed interface 812. In some implementations, the high-speed interface 808 connects to the memory 804 and multiple high-speed expansion ports 810. In some implementations, the low-speed interface 812 connects to a low-speed expansion port 814 and the storage device 806. Each of the processor 802, the memory 804, the storage device 806, the high-speed interface 808, the high-speed expansion ports 810, and the low-speed interface 812, are interconnected using various buses, and may be mounted on a common motherboard or in other manners as appropriate. The processor 802 can process instructions for execution within the computing device 800, including instructions stored in the memory 804 and/or on the storage device 806 to display graphical information for a graphical user interface (GUI) on an external input/output device, such as a display 816 coupled to the high-speed interface 808. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of a computer-readable medium, such as a magnetic or optical disk.

The storage device 806 is capable of providing mass storage for the computing device 600. In some implementations, the storage device 806 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 802, perform one or more methods, such as those described above. The instructions can also be stored by one or more storage devices, such as computer-readable or machine-readable mediums, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards. In the implementation, the low-speed interface 812 is coupled to the storage device 606 and the low-speed expansion port 814. The low-speed expansion port 814, which may include various communication ports (e.g., USB, Bluetooth, Ethernet, wireless Ethernet) may be coupled to one or more input/output devices. Such input/output devices may include a scanner 830, a printing device 834, or a keyboard or mouse 836. The input/output devices may also be coupled to the low-speed expansion port 814 through a network adapter. Such network input/output devices may include, for example, a switch or router 832.

The computing device 800 may be implemented in a number of different forms, as shown in the FIG. 8. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device, such as a mobile computing device 850. Each of such devices may contain one or more of the computing device 800 and the mobile computing device 850, and an entire system may be made up of multiple computing devices communicating with each other.

The mobile computing device 850 includes a processor 852; a memory 864; an input/output device, such as a display 854; a communication interface 866; and a transceiver 868; among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate. In some implementations, the mobile computing device 850 may include a camera device(s) (not shown).

The processor 852 can execute instructions within the mobile computing device 850, including instructions stored in the memory 864. The processor 852 may be implemented as a chipset of chips that include separate and multiple analog and digital processors. For example, the processor 852 may be a Complex Instruction Set Computers (CISC) processor, a Reduced Instruction Set Computer (RISC) processor, or a Minimal Instruction Set Computer (MISC) processor. The processor 852 may provide, for example, for coordination of the other components of the mobile computing device 850, such as control of user interfaces (UIs), applications run by the mobile computing device 850, and/or wireless communication by the mobile computing device 850.

The processor 852 may communicate with a user through a control interface 858 and a display interface 656 coupled to the display 854. The display 854 may be, for example, a Thin-Film-Transistor Liquid Crystal Display (TFT) display, an Organic Light Emitting Diode (OLED) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 664 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a Single in Line Memory Module (SIMM) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provided as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 852, perform one or more methods, such as those described above. The instructions can also be stored by one or more storage devices, such as one or more computer-readable or machine-readable mediums, such as the memory 864, the expansion memory 874, or memory on the processor 852. In some implementations, the instructions can be received in a propagated signal, such as, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 868 using a radio frequency. In addition, short-range communication, such as using a Bluetooth or Wi-Fi, may occur. In addition, a Global Positioning System (GPS) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 760 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 550.

The mobile computing device 850 may be implemented in a number of different forms, as shown in FIG. 8. For example, it may be implemented the example environment 300 described in FIG. 3. Other implementations may include a tablet device 882 and a laptop device 884. The mobile computing device 850 may also be implemented as a component of a smart-phone, personal digital assistant, AR device, or other similar mobile device.

Computing device 800 and/or 850 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for passive continuous identity authentication of an individual based on gesture data, the method being executed by one or more processors and comprising:

activating a continuous authentication mode to authenticate a user as they utilize swiping gestures on a touch screen;

training, by a mobile device, at least two clusters of classifiers for identifying a user by motion data and touch data features unique to the individual in a way the user executes a standard mobile device swipe gesture with each cluster of classifiers corresponding to a different orientation configuration of the user with respect to the mobile device selected from the group consisting of the user standing, walking, sitting, prone, inclined, and lying down;

receiving, by the mobile device, gesture data post sign-in for one or more swiping gestures, received on a touch screen of the mobile device from an individual during continued interaction by the individual with an application running on the mobile device;

generating, by the mobile device, specific features extracted from the one more swiping gestures including features of gesture patterns specific to the user for implementing a swipe gesture from the group consisting of a standard swipe right gesture, a standard swipe left gesture, a standard swipe up gesture, and a standard swipe down gesture;

comparing, by the mobile device, the specific features with the at least two clusters of classifiers stored on the mobile device; and verifying, based on the comparing, that an identity of the individual matches an identity of the user.

2. A computer-implemented method, comprising:

activating a continuous authentication mode to authenticate a user as they utilize swiping gestures on a touch screen;

in an enrollment phase, training, by a mobile device, a first set of classifiers for identifying a user by features unique to touch data and motion data in a way the user executes a standard mobile device gesture in a first orientation configuration of the user with respect to the mobile device, including training a first classifier for a standard swipe right gesture of the user, a second classifier for a standard swipe left gesture of the user, a third classifier for a standard swipe up gesture of the user, and a fourth classifier for a standard swipe down gesture of the user;

updating the training to train a second set of classifiers for identifying the user by features unique to the touch data and motion data in the way the user executes a standard mobile device gesture in a second orientation configuration of the user with respect to the mobile device, including training a fifth classifier for a standard swipe right gesture of the user, a sixth classifier for a standard swipe left gesture of the user, a seventh classifier for a standard swipe up gesture of the user, and an eighth classifier for a standard swipe down gesture of the user;

receiving gesture data including motion data and touch data post sign-in for swiping gestures received on a touch screen of the mobile device from an individual during continued interaction by the individual with an application running on the mobile device;

generating specific motion and touch features extracted from including motion and touch features of gesture patterns specific to the individual for swiping gestures from the group consisting of the standard swipe right gesture, the standard swipe left gesture, the standards swipe up gesture, and the standard swipe down gesture;

comparing, by the mobile device, the specific features with the first and second set of classifiers stored on the mobile device;

verifying that an identity of the individual matches an identity of the user wherein the touch data and the motion data includes location, force, and size of the one or more swiping gestures; and wherein the first and second orientation configurations are different orientation configurations selected from the group consisting of a user standing, walking, sitting, prone, inclined, and lying down.

* * * * *